(12) United States Patent
Liao et al.

(10) Patent No.: US 6,821,708 B2
(45) Date of Patent: Nov. 23, 2004

(54) CYANINE-TCNQ COMPLEX DYE DATA STORAGE MEDIA AND MANUFACTURING METHOD THEREOF

(75) Inventors: Wen-Yih Liao, Taichung (TW);
Ming-Chia Lee, Taichung Hsien (TW);
Chien-Liang Huang, Taoyuan (TW);
Chuen-Fuw Yan, Kaohsiung (TW);
Tzuan-Ren Jeng, Hsinchu (TW);
Andrew Teh Hu, Hsinchu (TW);
Chung-Chun Lee, Yun-Lin Hsien (TW)

(73) Assignees: Industrial Technology Research Institute, Hsinchu (TW); National Tsing Hua University, Hsinchu (TW)

( * ) Notice: Subject to any disclaimer, the term of this patent is extended or adjusted under 35 U.S.C. 154(b) by 0 days.

(21) Appl. No.: 10/377,935

(22) Filed: Feb. 28, 2003

(65) Prior Publication Data

US 2003/0138729 A1 Jul. 24, 2003

Related U.S. Application Data

(63) Continuation of application No. 09/917,751, filed on Jul. 31, 2001.

(51) Int. Cl.[7] .................................................. G11B 7/24
(52) U.S. Cl. ........................... 430/270.19; 430/270.21; 430/945; 369/284; 428/64.8
(58) Field of Search ........................... 430/945, 270.19, 430/270.21; 428/64.8; 369/284

(56) References Cited

U.S. PATENT DOCUMENTS

| | | | | |
|---|---|---|---|---|
| 4,735,839 A | * | 4/1988 | Sato et al. ................. | 428/64.7 |
| 4,753,839 A | * | 6/1988 | Greenway .................... | 428/152 |
| 5,503,957 A | * | 4/1996 | Kim et al. .............. | 430/270.21 |
| 5,579,150 A | * | 11/1996 | Cho et al. ................... | 359/241 |
| 5,763,153 A | * | 6/1998 | Tsuzuki et al. ............. | 430/584 |
| 5,773,193 A | * | 6/1998 | Chapman et al. ........ | 430/270.16 |
| 5,958,087 A | * | 9/1999 | Liao et al. ..................... | 8/644 |
| 6,506,539 B2 | * | 1/2003 | Morishima et al. .... | 430/270.19 |
| 2003/0068577 A1 | * | 4/2003 | Liao et al. ............. | 430/270.19 |

FOREIGN PATENT DOCUMENTS

JP      63-064794     *    3/1988

OTHER PUBLICATIONS

Morishima et al., A new type of light stabilizer for dye layers . . . , Jpn. J. Appl. Phys., vol. 38(1,3b) pp. 1634–1637 (Mar. 1999).*
Cho et al., Optical recording study of cyanine dye_TCNQ complexes, Mol. Cryst. Liq. Cryst. Pp. 393–398 (1995).*

* cited by examiner

Primary Examiner—Martin Angebranndt
(74) Attorney, Agent, or Firm—J.C. Patents

(57) ABSTRACT

This invention provides a data storage media comprising at least a cyanine-TCNQ complex dye having the structural formula:

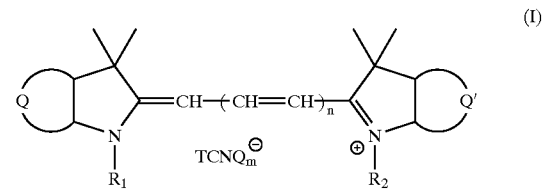

wherein Q and Q' denote aromatic or polyaromatic, R1 and R2 are selected from the group consisting of alkyl, arylester, alkoxy, alkylthio, and alkoxythio etc., n represents an integer of 0, 1, 2, and 3, TCNQ-m represents 7,7',8,8'-tetracyanoquinodimethane or its derivatives, and m is an integer of 1 or 2. The data storage media comprising the cyanine-TCNQ complex dye includes a reflection optical recording media and a non-reflection fluorescent optical recording media suiting the requirement.

4 Claims, 20 Drawing Sheets

CYANINE-TCNQ COMPLEX DYE DATA STORAGE MEDIA AND MANUFACTURING METHOD THEREOF

CROSS-REFERENCE TO RELATED APPLICATION

This application is a continuation application of prior application Ser. No. 09/917,751, filed Jul. 31, 2001.

BACKGROUND OF INVENTION

1. Field of the Invention

The present invention relates to a data storage media, and more particularly to a data storage media comprising at least a cyanine-TCNQ complex dye, which cyanine-TCNQ complex dye has a maximum absorption and high fluorescent quantum efficiency in the light region of wavelength ranging between $\lambda=400$ nm~800 nm.

2. Description of the Prior Art

A data storage medium with higher storage density, smaller size and lower cost is highly demanded. As magnetic storage medium is unable to satisfy these requirements, optical storage material is greatly sought for as an alternative. Ever since the discovery of the inherent photosensitizing property of organic dyes making it suitable for making optical data recording media, organic dyes have become useful and interesting research and development subject in electronics industry. Presently, organic dyes are widely used for making recording media for data storage because of their inherent photosensitizing property. The applications of organic dye include in the fields of, for example, nonlinear optical device, recording and displaying of optical disc data, photoresist, sensor and indicator for heat, light, and electron, during the transfer and storage of energy, medicine and biology, etc.

Cyanine blue having cyanine structure was first synthesized by Greville Williams in 1856 (K. Venkataraman (ed.), The Chemistry of Synthetic Dyes, Vol.II, pp.1143–1186, Academic Press, New York, 1952). In 1875, Vogel discovered that cyanine blue has specific photosensitizing properties. Therefore, cyanine blue, which was originally used as dye for textile, is also widely used in electronics industry for producing value-added data storage media. Cyanine dye exhibits excellent photosensitizing property in UV/Visible to IR. Accordingly, cyanine dye can also used as a photoresist layer in semiconductor processing and as optical data storage medium in electronic industry.

Cyanine TCNQ complex was first synthesized by J. H. Lupinski et al. in 1967. ("Tetracyanoquinodimethane Derivatives of Cyanine Dyes", Vol. 3, pp.241–250, Molecular Crystals, Great Britain, 1967.) In 1981, 3,3'-diethyl-12-acetyl-thiatetracyanine perchlorate was first proposed for application in optical disc fabrication by Law et al. (K. Y. Law, P. S. Vincett, and G. E. Johnson, Appl. Phys. Lett., 39, 718 (1981)). The cyanine dye and PVAc (poly(vinyl acetate)) were first mixed and then spin-coated to form an optical recording medium. After this successful application, a variety of cyanine dyes were developed for optical disc applications, such as those disclosed in U.S. Pat. Nos. 5,019,476, 5,292,615, 5,328,802, 5,332,608, 5,424,171, 5,455,094, and 5,579,150 etc.

However, organic compounds containing the polymethine structure have a poor photostability. General cyanine dye also has the same problem since it belongs to this group of compound. Hence, it is desirable to develop a new cyanine dye having an excellent photostability. In 1999, Shin-ichi Morishima et al., Fuji-film company in Japan, attempted to use the doping method. (Shin-ichi Morishima et al., Jpn. J. Appl. Phys. Vol. 38 (1999), pp.1634–1637). Addition of neutral TCNQ derivative to dye increases the photostability of dye, however, TCNQ is not quite soluble in the common organic solvents so that content of doping dye formulation is limited, therefore, the stability effect is also limited.

SUMMARY OF THE INVENTION

Accordingly, it is an object of this invention to resolve the drawbacks as described above.

It is another object of this invention to provide a data storage media comprising at least a cyanine-TCNQ complex dye, which cyanine-TCNQ complex dye has a high oxidation potential for preventing the oxidation of dyes.

It is another object of this invention to provide a data storage media comprising at least a cyanine-TCNQ complex dye, which cyanine-TCNQ complex dye has a maximum absorption in light region having wavelength in the range of 400~800 nm and possess high fluorescent quantum efficiency.

It is another object of the present invention to provide a data storage media comprising at least a cyanine-TCNQ complex dye, which cyanine-TCNQ complex dye has a better solubility in a variety of organic solvents so that a stable homogenous solution with uniform distribution of cyanine-TCNQ complex dye can be obtained. Thus a high quality coating using this solution can be achieved for making a high quality data storage media for recording purpose.

It is another object of this invention to provide a data storage media comprising at least a cyanine-TCNQ complex dye, which cyanine-TCNQ complex dye has a photostabilizing feature. Thus cost of a photostabilizing agent can be effectively avoided, and therefore the manufacturing cost can be effectively reduced.

In accordance with the above objects and other advantages as broadly described herein, the present invention provides a data storage media comprising at least a cyanine-TCNQ complex dye having a structural formula (I) as shown in the following:

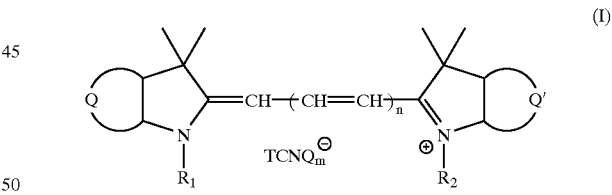

(I)

wherein Q and Q' denote aromatic or polyaromatic, R1 and R2 denote one of alkyl, arylester, alkoxy, alkylthio, and alkoxythio etc., n represents an integer of 0, 1, 2, and 3. The TCNQ-m represents 7,7',8,8'-tetracyanoquinodimethane and its derivatives, and wherein m is an integer of 1 or 2. The cyanine-TCNQ complex dye has a maximum absorption and high fluorescent quantum efficiency in the light region having wavelength in the range of $\lambda=400$ nm~800 nm. The data storage media comprising the cyanine-TCNQ complex dye of the present invention can be, but not limited, to a reflection optical recording media or a non-reflection fluorescent optical recording media suiting the requirement.

BRIEF DESCRIPTION OF THE DRAWINGS

For a more complete understanding of the present invention, reference will now be made to the following detailed description of preferred embodiments taken in conjunction with the accompanying drawings, in which.

DETAILED DESCRIPTION OF THE PREFERRED EMBODIMENTS

This invention provides a data storage media comprising at least a cyanine-TCNQ complex dye, which cyanine-TCNQ complex dye possess an excellent photostability and excellent solubility in a variety of organic solvents. The cyanine-TCNQ complex dye is produced by combining TCNQ molecules with cyanine dye molecules to form a stable dye complex.

Figure 1:
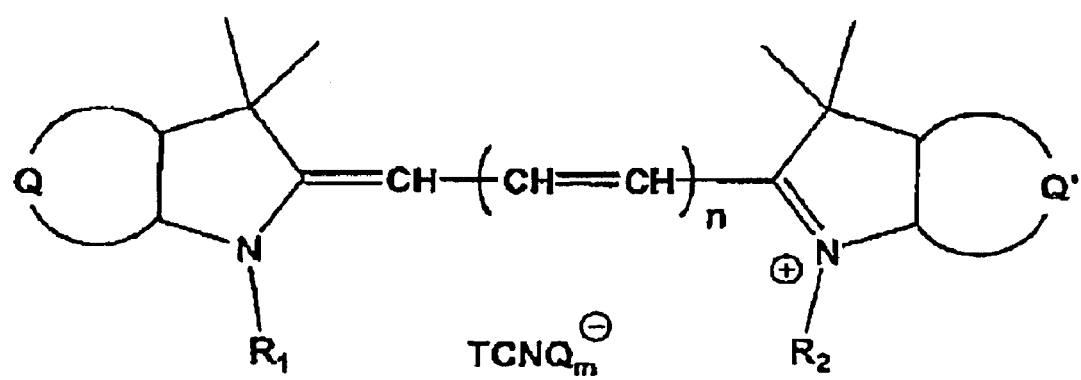
FIG. 1 illustrates the basic structural formula for cyanine-TCNQ complex dye (I) of this invention.

The structural formula (I) of cyanine-TCNQ complex dye of this invention is shown in FIG. 1, wherein Q and Q' are selected from one of aromatic and polyaromatic, R1 and R2 are selected from the group consisting of alkyl, arylester, alkoxy, alkylthio, and alkoxythio etc., n represents an integer of 0, 1, 2, and 3, TCNQ-m represents 7,7',8,8'-tetracyanoquinodimethane or its derivatives, and m represents an integer of 1 or 2.

Figure 2:
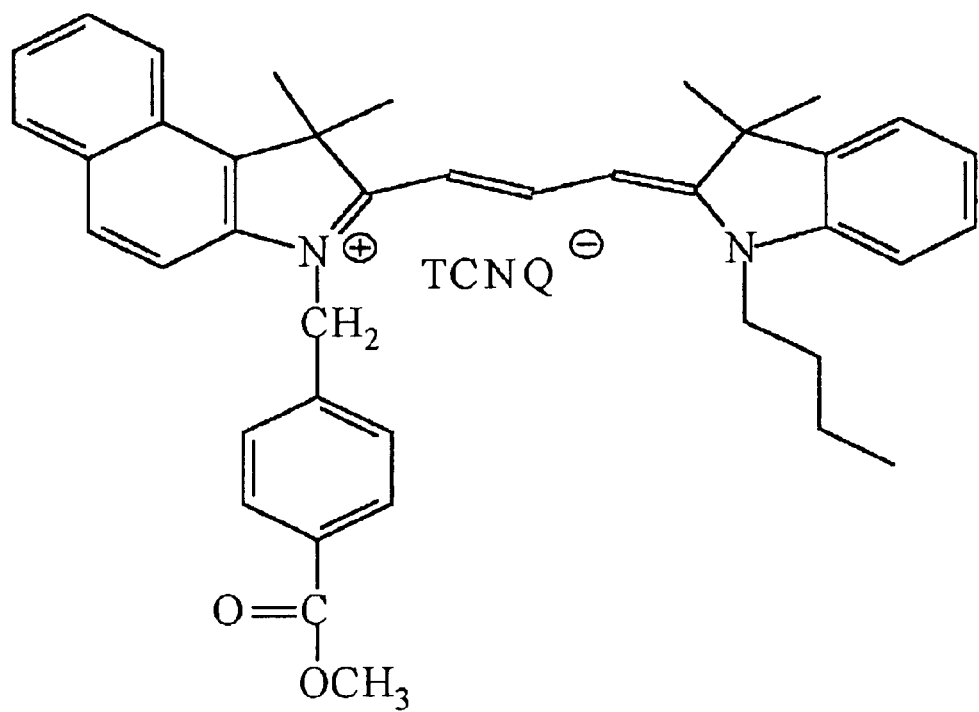
FIG. 2 illustrates the structural formula for cyanine-TCNQ complex dye (II) of this invention.

FIG. 2 shows a structural formula of a cyanine-TCNQ dye (II) as a specific example of the cyanine-TCNQ complex dye (I) of this invention.

Figure 3:
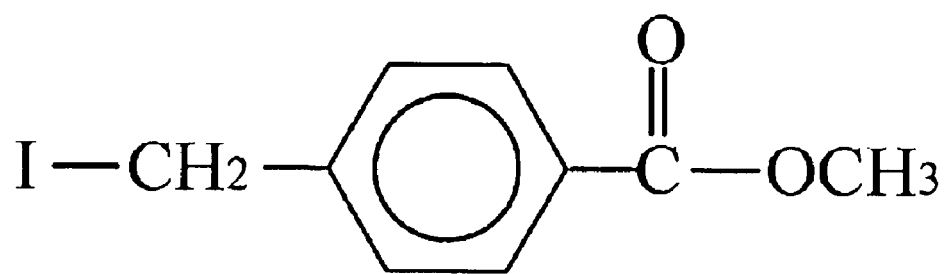
FIG. 3 illustrates the structural formula of the compound abbreviated as MIB, which is synthesized according a synthesis example of this invention.

FIG. 3 shows a structural formula of a cyanine-TCNQ dye (III) as another specific example of the cyanine-TCNQ complex dye (I) of this invention, wherein n=1, both R1 and R2 are —$CH_2C_6H_4COOCH_3$; and the cyanine-TCNQ dye (IV) as yet another specific example of the cyanine-TCNQ complex dye (I), wherein n=2, both R1 and R2 are —$CH_2C_6H_4COOCH_3$.

In this invention the cyanine-TCNQ complex dye (I) is produced by combining the TCNQ molecules and cyanine dye molecules to form a stable dye complex, wherein the TCNQ molecules chemically bonds with the cyanine dye molecules to form a stable charge transfer complex. The cyanine-TCNQ complex dye (I) has a maximum absorption both in UV light region with wavelength range of 200 nm~400 nm and in near IR light region with wavelength range of 800 nm~1000 nm. Thus the short wave light resource (the wavelength is smaller than 400 nm) can be eliminated which would otherwise tend to break the chemical bonds. In addition, since the cyanine TCNQ charge transfer complex possesses a higher oxidation potential than that of a general cyanine halide such as a cyanine $ClO_4$, or cyanine $PF_6$ complex, and therefore TCNQ possesses a better inhibition to singlet oxygen so that the main structure of cyanine dye, can be effectively protected from singlet oxygen attack, and thus can increase the photostability of the cyanine-TCNQ complex dye. Thus a need of addition of a photostabilizer can be eliminated.

The manufacturing method of the cyanine-TCNQ complex dye of this invention is described as follows. The substituted methyl (4-iodomethyl) benzoate is synthesized by reacting 4-chloromethyl benzoyl chloride with methanol in benzene in presence of pyridine by heating the reaction mixture at 40° C.~60° C. for several hours. Next, the substituted methyl (4-iodomethyl)benzoate is reacted with 2,3,3-trimethyl-4,5-benzo-3H-indole in benzene by heating the reaction mixture at 80° C.~100° C. for 3~8 hours, to obtain 1-(4'-methoxycarbonyl)benzyl-2,3,3-trimethyl-4,5-benzo-3H-indolium iodide. Afterwards, 1-butyl-2,3,3-trimethyl indolenine is obtained by reacting iodobutane with 2,3,3-trimethyl indolenine in benzene by heating the reaction mixture at 80° C.~100° C. for 3~8 hours. Next, 1-(4'-methoxy-carbonyl)-benzyl-2,3,3-trimethyl-4,5-benzo-3H-indolium iodide is reacted with N,N'-diphenylformamidine in acetic anhydride heated together at 100° C.~120° C. for 1~3 hours, to obtain a compound (A). Afterwards, a mixture of 1-butanyl-2,3,3-trimethylindolenine, compound (A), and sodium acetate in acetic anhydride is heated at 100° C.~120° C. for 1~3 hours, then iodide is displaced with LiTCNQ (the synthesis of LiTCNQ is according to L. R. Melby et al., J. Am. Chem. Soc., 84, p.3374, (1962)) to obtain the compound (B), 2-[3-(1,3-dihyhro-1,1-dimethyl-3-(4'-methoxycarbonyl)-benzyl-2H-benze[e]indol-2-ylidene)-1-propenyl]1,1-dimethyl-3-butyl-1H-indolium TCNQ.

The cyanine-TCNQ complex dye (I) synthesized by the above described method is soluble in alcohols such as methanol, ethanol, and isopropyl alcohol etc., ketones such as acetone and methyl ethyl ketone (MEK) etc., ethers such as diethyl ether, and tetrahydrofuran etc., chloroform, dichloromethane, and DMF etc. Therefore, cyanine-TCNQ complex dye of the present invention can be coated using conventional methods such as spurt coating, roll-pressure coating, dip or spin coating etc. to form a thin layer over a substrate which exhibit excellent stability and excellent quality. It is primary to chemically bond the TNCQ molecule with the cyanine dye molecule to form a stable complex, which cyanine-TCNQ complex dye inherently possesses a oxidation potential higher than that of general cyanine halide such as cyanine $ClO_4$, or a cyanine $PF_6$ complex. This inherent feature would effectively inhibit singlet oxygen from attacking the main structure of cyanine dye, and thus the photostability of cyanine-TCNQ complex dye (I) can be effectively promoted.

The cyanine-TCNQ complex dye (I) may include one of the cyanine-TCNQ complex dye (II), the cyanine-TCNQ complex dye (III), the cyanine-TCNQ complex dye (IV), or mixtures thereof, suitable for making a data storage media.

The cyanine-TCNQ complex dye (I) of this invention is not only used as optical recording media, but it can also be used for increasing photo sensitivity of silver salt used in photo, copy writing and printing purposes.

Following are some examples describing synthesis of cyanine-TCNQ complex dye (I) of this invention, and an example of manufacturing a data storage media using the cyanine-TCNQ complex dye (I) of this invention.

EXAMPLES

Example-1

Preparation of 2-[3-(1,3-dihydro-1,1-dimethyl-3(4'-methoxycar-bonyl)-benzyl-2H-benze[e]indol-2-ylidene)-1-propenyl]1,1-dimethyl-3-butyl-1H indolium TCNQ (abbreviated as SL-TCNQ), SL cyanine TCNQ dye:

2-[3-(1,3-dihydro-1,1-dimethyl-3(4'-methoxycar-bonyl)-benzyl-2H-benze[e]indol-2-ylidene)-1-propenyl]1,1-dimethyl-3-butyl-1H indolium TCNQ (abbreviated as SL-TCNQ), SL cyanine TCNQ dye is prepared as follows, the structural formula of cyanine TCNQ complex dye (II) is shown in FIG. 2:

(a) First, methyl (4-iodomethyl)benzoate (abbreviated as MIB) is prepared as follows, the structural formula of MIB is shown in FIG. 3:

A mixture of solution containing 4-chloromethylbenzoyl chloride (TCI Chemical) (1.89 g), methanol (0.32 g), and pyridine (0.791 g) in benzene (25 mL) is heated at 45° C. for 1~3 hours, and then filtered and evaporated to obtain white solids. The white solids is then dissolved in acetone and sodium iodide (1.50 g) is added to this mixture, and the mixture is heated at 40° C. for 3~5 hours. The resulting mixture is filtered, extracted using dichloromethane and water mixture, and then the extracted mixture is evaporated to obtain a light yellow solids. The yield is 90%, and the m.p. of the light yellow solids is 67° C.

Figure 4:
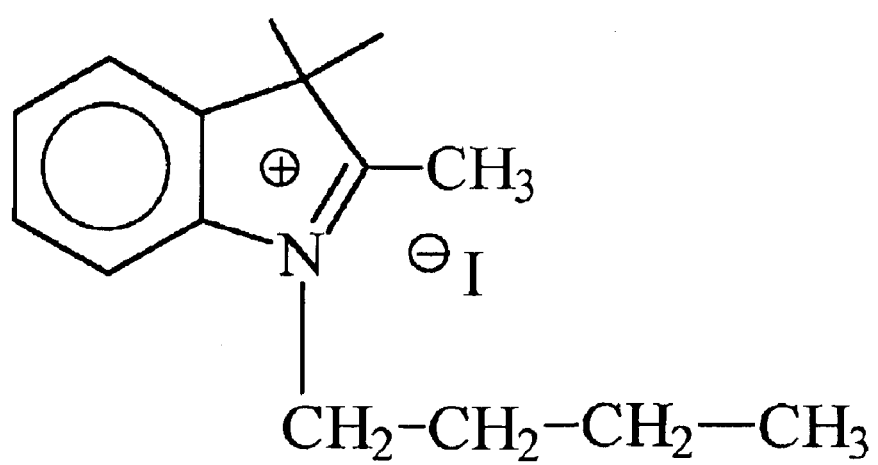
FIG. 4 illustrates the structural formula for the compound abbreviated as BII, which is synthesized according a synthesis example of this invention.

(b) Next, 1-butyl-2,3,3-trimethyl indoleninium iodide (abbreviated as BII) is prepared as follows, the structural formula of BII is shown in FIG. 4:

A mixture of solution containing iodobutane (TCI Chemical) (2.76 g) and 2,3,3-trimethyl indolenine (TCI Chemical) (2.38 g) in benzene is heated at 80° C.~85° C. for 4 hours. The solution is evaporated and recrystallized from ethyl acetate to obtain light yellow crystals. A yield of 85% is achieved, the m.p. of the light yellow crystals is 102° C.

Figure 5:
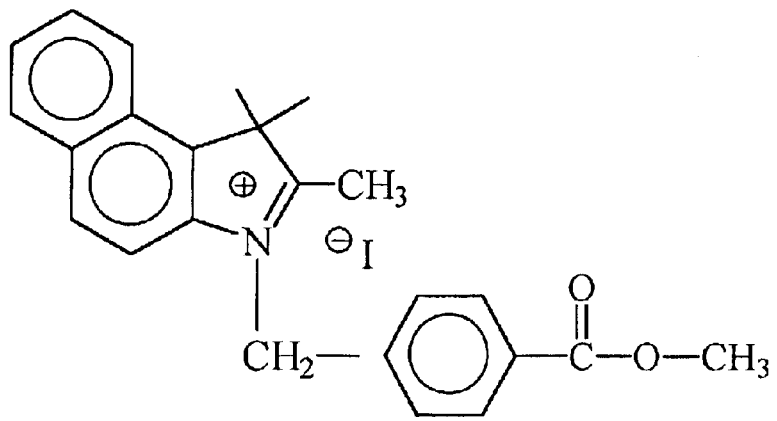
FIG. 5 illustrates the structural formula for the compound abbreviated as, which is synthesized according a synthesis example of this invention.

(c) 1-(4'-methoxycarbonyl)benzyl-2,3,3-trimethyl-4,5-benzo-3H-indoleninium iodide (abbreviated as MBTI) is prepared as follows, the structural formula of MBTI as shown in FIG. 5:

A mixture of solution containing MIB (2.76 g) and 2,3,3-trimethyl-4,5-benzo-3H-indole (TCI Chemical) (1.75 g) in benzene is heated at 80° C.~90° C. for 4~8 hours. The resulting solution is evaporated and recrystallized from methanol to obtain a light grey crystals. A yield of 75% is achieved, the m.p. of the light grey crystal is 120° C.

Figure 6:
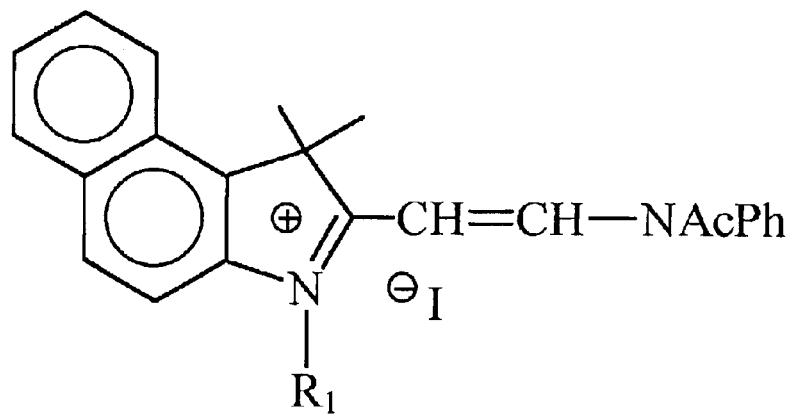
FIG. 6 illustrates the structural formula of an intermediate (A), which is synthesized according a synthesis example of this invention.
Figure 6:
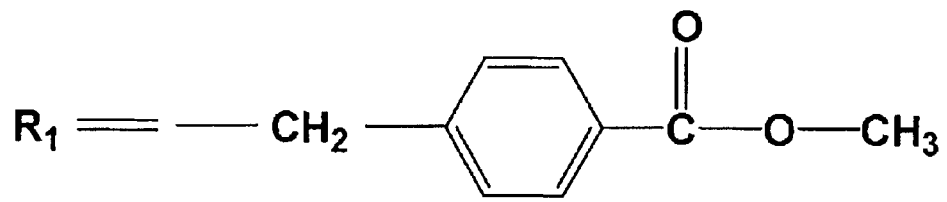

(d) Intermediate (A) is prepared as follows, the structural formula of (A) as shown in FIG. 6:

A mixture of solution containing MBTI (6.16 g) and N,N'-diphenylformamidine (1.12 g) in acetic anhydride (20 mL) is heated at 100° C.~120 ° C. for 2 hours. After cooling, the reaction mixture is charged into an aqueous solution of sodium perchlorate (1.41 g) to obtain a solid substance, then this is dissolved in dichloromethane, washed with water several times, evaporated and recrystallized from ethanol to obtain intermediate (A). A yield of 70% is achieved.

Figure 7:
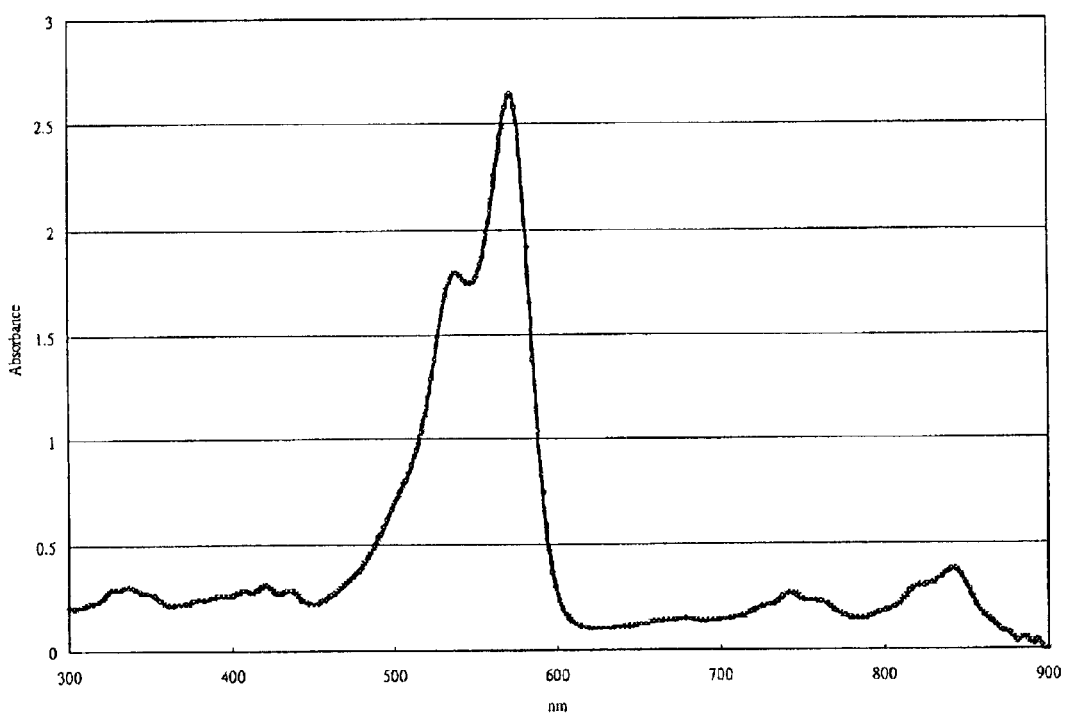
FIG. 7 illustrates the UV/Visible/IR absorption spectrum of the cyanine-TCNQ complex dye (II) of this invention.
Figure 8:
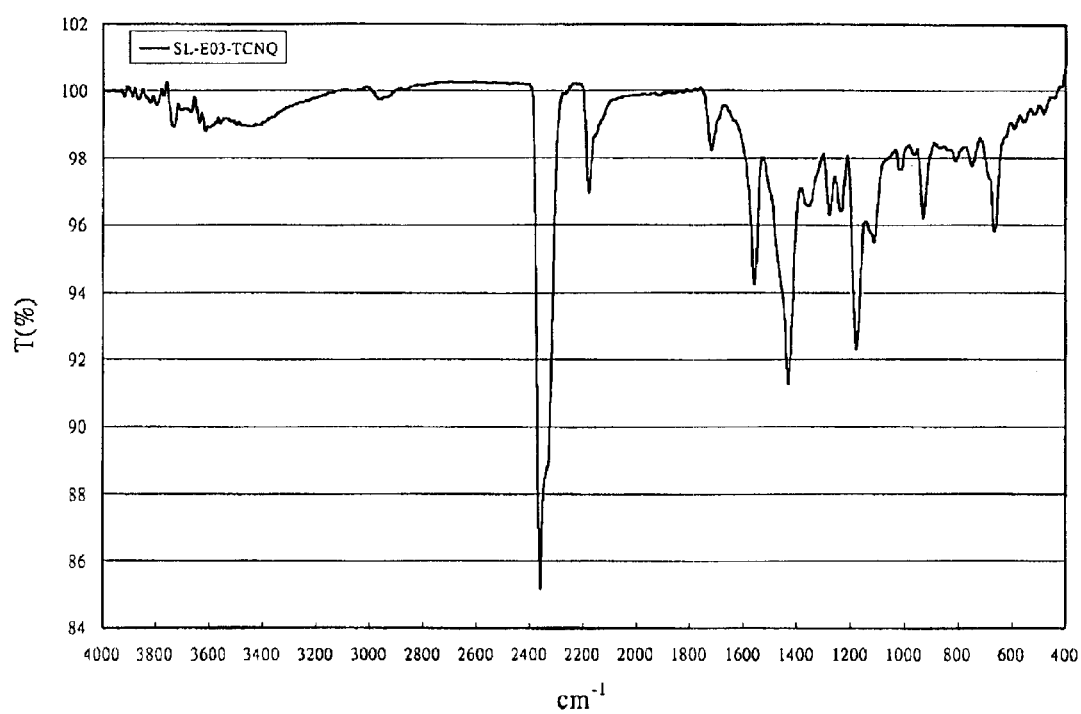
FIG. 8 illustrates an infrared (IR) spectrum of the cyanine-TCNQ complex dye (II) of this invention.
Figure 9:
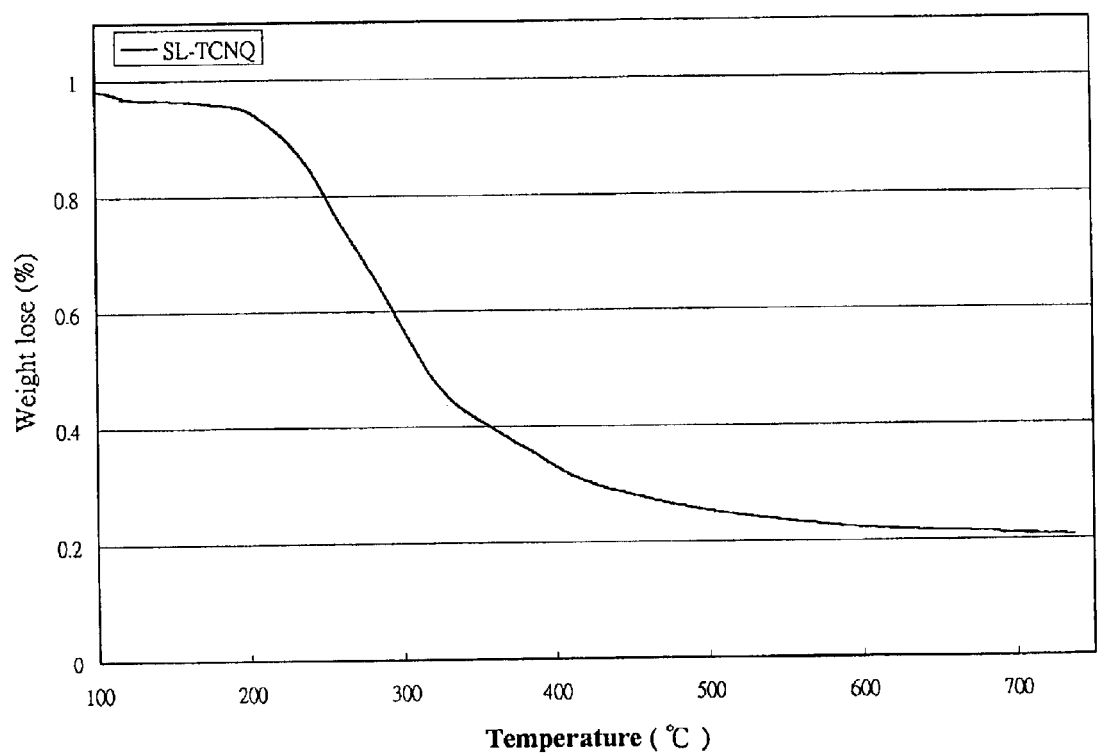
FIG. 9 illustrates the thermoweighing spectrum (10° C./min) of the cyanine-TCNQ complex dye (II) of this invention.

(e) 2-[3-(1,3-dihyhro-1,1-dimethyl-3-(4'-methoxycarbonyl)-benzyl-2H-benze[e]indol-2-ylidene)-1-propenyl]1,1-dimethyl-3-butyl-1H indolium TCNQ (II) is prepared as follows, the structural formula of cyanine TCNQ-complex dye (II) is shown in FIG. 2:

1-(4'-methoxycarbonyl)-2,3,3-trimethyl-4,5-benzo-3H-indole (0.02 mole) and ethyl orthoformate (TCI Chemical) (0.01 mole) charged into a two-necked flask, dissolved in pyridine, then the resulting mixture is heated at 110° C.~20° C. for 1~3 hours. After cooling, the reaction mixture is transferred into an aqueous solution of LiTCNQ (1.24 g) to obtain a solid substance, recrystallized from methanol to obtain a dark red crystals (III). The yield of 70% is achieved, the m.p. of the dark red crystals (III) is 190° C. FIG. 7 shows that the UV/Visible/IR absorption spectrum for cyanine TCNQ complex dye (II), λmax (EtOH)=568 nm, FIG. 8 and FIG. 9 show that IR spectrum and thermoweighing spectrum (10° C./min) for cyanine TCNQ complex dye (II), respectively.

Example-2

Figure 10:
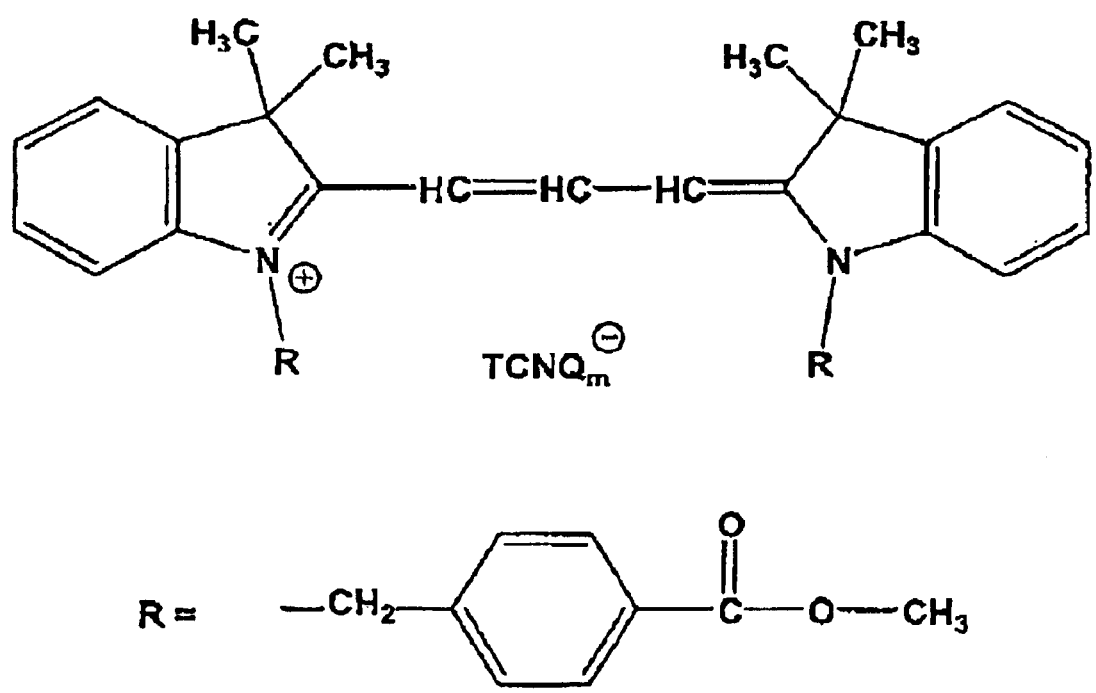
FIG. 10 illustrates the structural formula for cyanine-TCNQ complex dye (III) of this invention.

Preparation of 1-(4'-methoxycarbonyl)benzyl-3,3-trimethyl-1'-(4'-methoxycarbonyl)benzyl-3,3'-dimethylindo-2,2'-trimethine TCNQ (abbreviated as S-TCNQ), S cyanine TCNQ dye:

1-(4'-methoxycarbonyl)benzyl-3,3-trimethyl-1'-(4'-methoxycarbonyl)benzyl-3,3'-dimethylindo-2,2'-trimethine TCNQ (abbreviated as S-TCNQ), S cyanine TCNQ dye is prepared as follows, the structural formula of cyanine TCNQ complex dye (III) is shown in FIG. 10:

(a) Methyl (4-iodomethyl)benzoate (MIB) is prepared by heating a mixture of solution containing 4-chloromethylbenzoyl chloride (TCI Chemical) (1.89 g, 0.01 mole), methanol (0.32 g, 0.01 mole), and pyridine (0.791 g, 0.01 mole) in benzene at 40° C. for 3 hours, then the resulting reaction mixture is filtered and evaporated to obtain a white substance. The white substance is dissolved in acetone and sodium iodide (1.50 g) is added, the resulting mixture is heated at 40° C. for 3 hours, then the resulting mixture is filtered, extracted from dichloromethane and water, and evaporated to obtain a light yellow product.

(b) 1-(4'-methoxycarbonyl)benzyl-2,3,3-trimethyl-4,5-benzo-3H-indole is prepared as follows:

A mixture of solution containing MIB (0.01 mole) and 2,3,3-trimethyl-4,5-benzo-3H-indole (TCI Chemical) (0.01 mole) in MEK is heated at 80° C. for 3 hours. The resulting solution is then evaporated and recrystallized from ethyl acetate to obtain white crystals.

Figure 11:
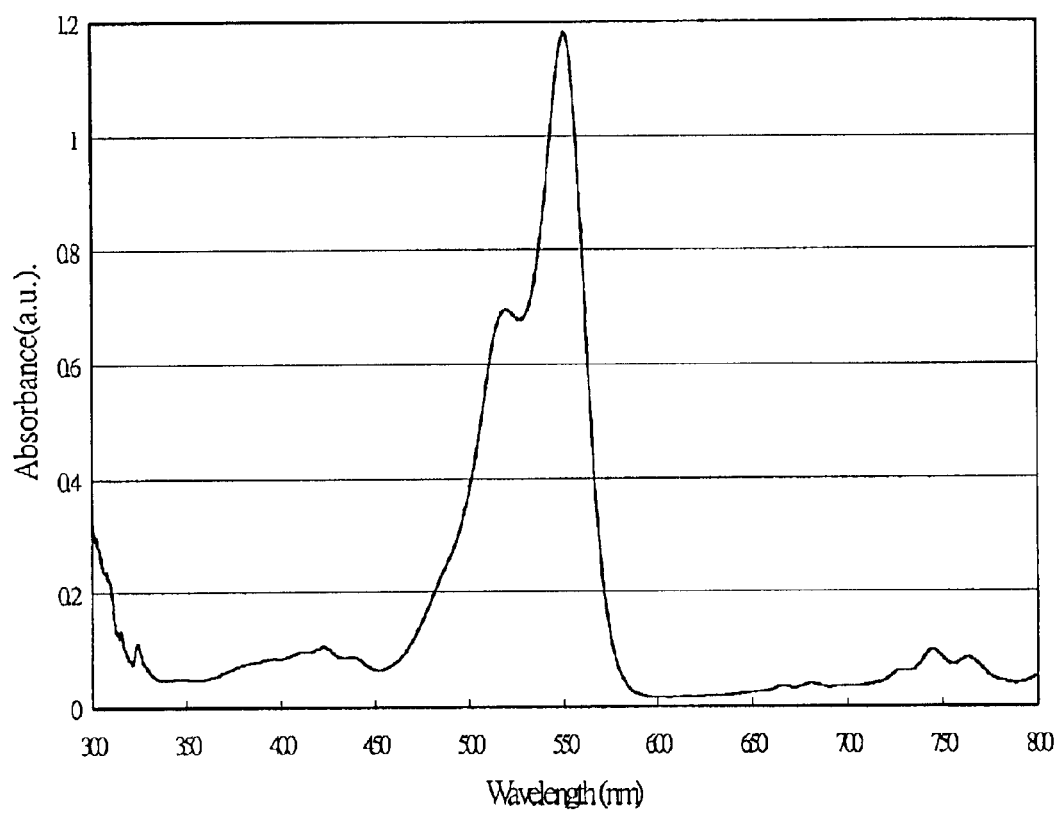
FIG. 11 illustrates the UV/Visible/IR absorption spectrum of the cyanine-TCNQ complex dye (III) of this invention.
Figure 12:
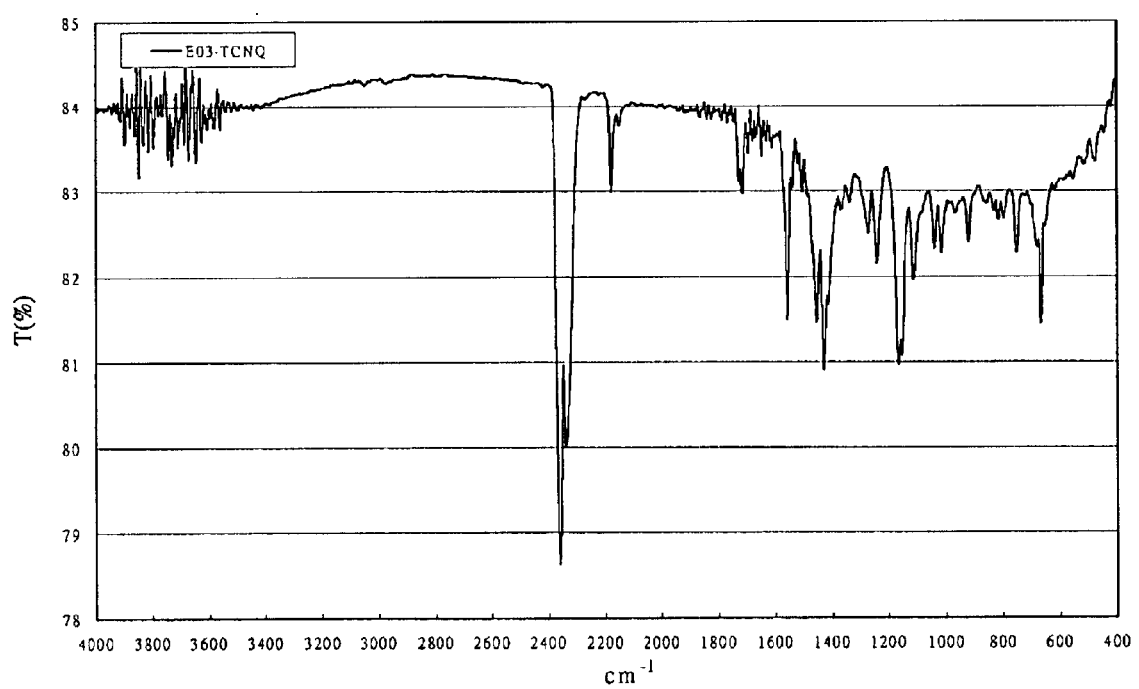
FIG. 12 illustrates an infrared (IR) spectrum of the cyanine-TCNQ complex dye (III) of this invention.
Figure 13:
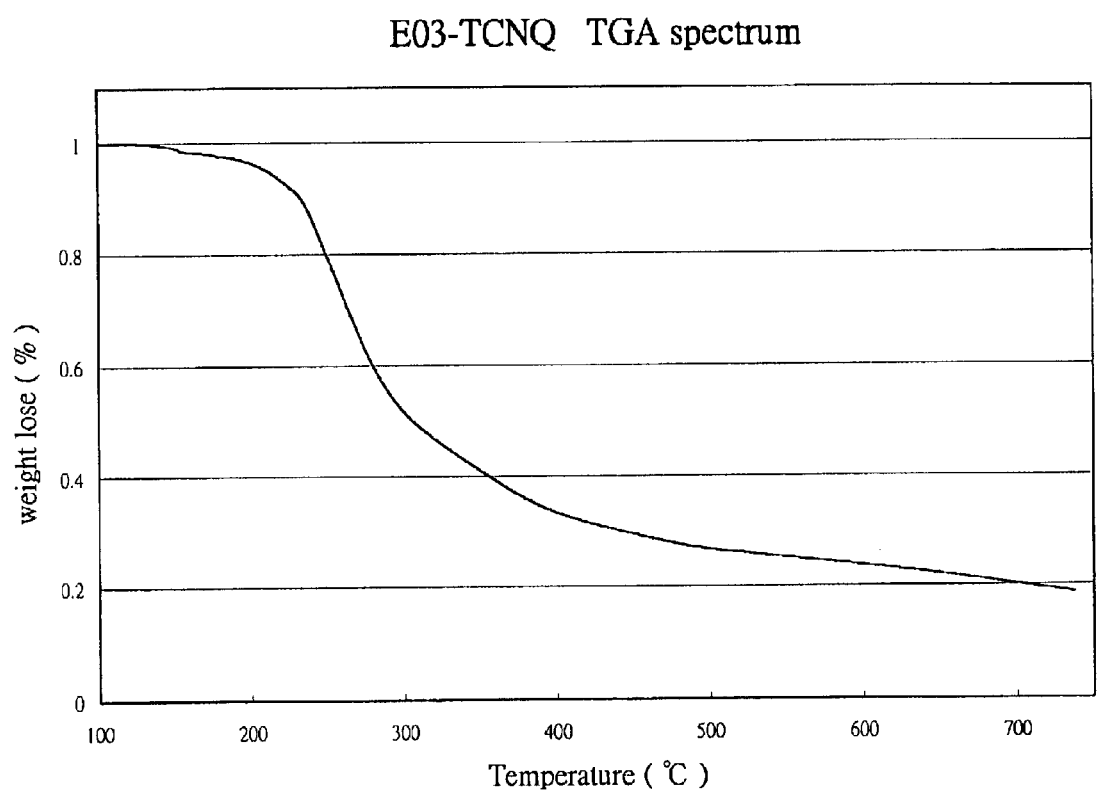
FIG. 13 illustrates the thermoweighing spectrum (10° C./min) of the cyanine-TCNQ complex dye (III) of this invention.

(c) 1-(4'-methoxycarbonyl)benzyl-2,3,3-trimethyl-1'-(4'-methoxycarbonyl)benzyl-3,3'-dimethylindo-2,2'-trimethine TCNQ is prepared as follows:

A mixture of solution containing 1-(4'-methoxycarbonyl)benzyl-2,3,3-trimethyl-4,5-benzo-3H-indole (0.02 mole) and ethyl orthoformate (TCI Chemical) (0.01 mole) in pyridine is heated at 110° C.~120° C. for 1~3 hours. After cooling the resulting reaction mixture, the reaction mixture is charged into an aqueous solution of LiTCNQ (1.24 g) to obtain a solid substance, which then recrystallized from methanol to obtain dark red crystals (III). A yield of 73% is achieved, the m.p. dark red crystals is 178° C. FIG. 11 shows that the UV/Visible/IR absorption spectrum for cyanine TCNQ complex dye (III), λmax (EtOH)=551 nm; FIG. 12 and FIG. 13 show that IR spectrum and thermoweighing spectrum (10° C./min) for cyanine TCNQ complex dye (III), respectively.

Example-3

Figure 14:
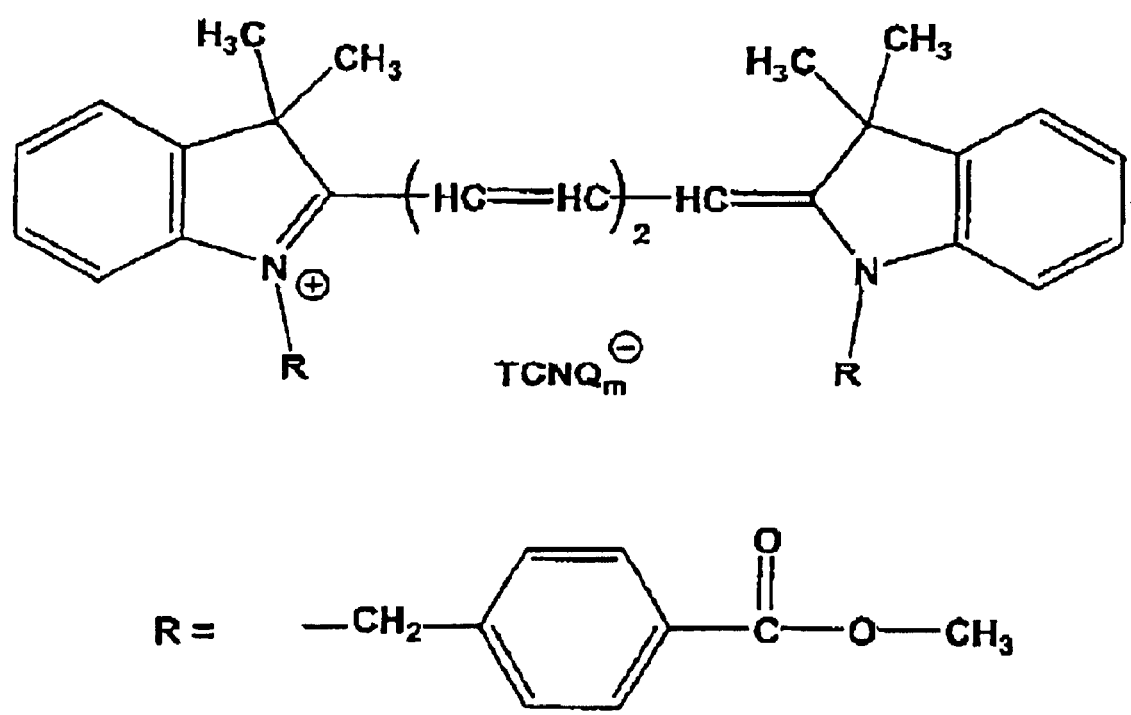
FIG. 14 illustrates the structural formula for cyanine-TCNQ complex dye (IV) of this invention.

Preparation of 1-(4"-methoxycarbonyl)benzyl-3,3-dimethyl-1'-(4"-methoxycarbonyl)benzyl-3,3'-dimethylindo-2,2'-pentamethine TCNQ:

1-(4"-methoxycarbonyl)benzyl-3,3-dimethyl-1'-(4"-methoxycarbonyl)benzyl-3,3'-dimethylindo-2,2'-pentamethine TCNQ is prepared as follows, the structural formula of cyanine TCNQ complex dye (IV) is shown in FIG. 14:

(a) The substituted methyl (4-iodomethyl)benzoate is prepared first, then the 1-1-(4'-methoxycarbonyl)benzyl-2,3,3-trimethylindoleninium iodide is prepared, finally reaction with 3-anilinoacryl-aldehyde anil give a compound having the structural formula (IV).

(b) Methyl (4-iodomethyl)benzoate (MIB) is prepared as follows, the structural formula of MIB as shown in FIG. 3:

A mixture of solution containing 4-chloromethylbenzoyl chloride (TCI Chemical) (1.89 g), methanol (0.32 g), and pyridine (0.791 g) in benzene (25 mL) is heated at 40° C. for 3 hours, the resulting reaction mixture is filtered and evaporated to obtain white solids. The white solids is then dissolved in acetone and then sodium iodide (1.50 g) is added, the resulting mixture is heated at 40° C. for 3 hours, filtered, extracted from dichloromethane and water, evaporated to obtain the light yellow solids. A yield of 90% is achieved, the m.p. of the light yellow solids is 67° C.

(c) 1-(4'-methoxycarbonyl)benzyl-2,3,3-trimethyl-4,5-benzo-3H-indoleninium iodide (MBTI) is prepared as follows, the structural formula of MBTI is shown in FIG. 5:

A mixture of solution containing MIB (2.76 g) and 2,3,3-trimethyl-4,5-benzo-3H-indolenine (TCI Chemical) (1.75 g) in benzene is heated at 80° C.~85° C. for 6 hours. The resulting reaction mixture is evaporated and recrystallized from ethyl acetate to obtain light yellow crystals. A yield of 71% is achieved, the light yellow crystals have a m.p. of 109° C.

Figure 15:
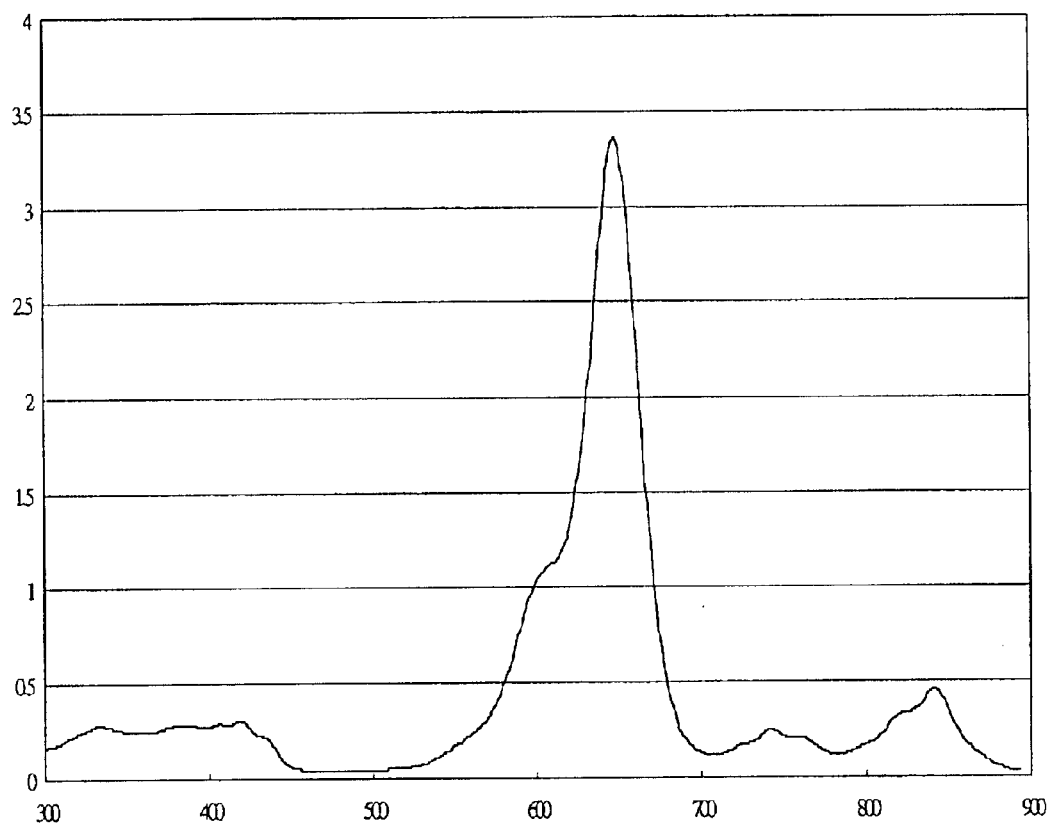
FIG. 15 illustrates the UV/Visible/IR absorption spectrum of the cyanine-TCNQ complex dye (IV) of this invention.
Figure 16:
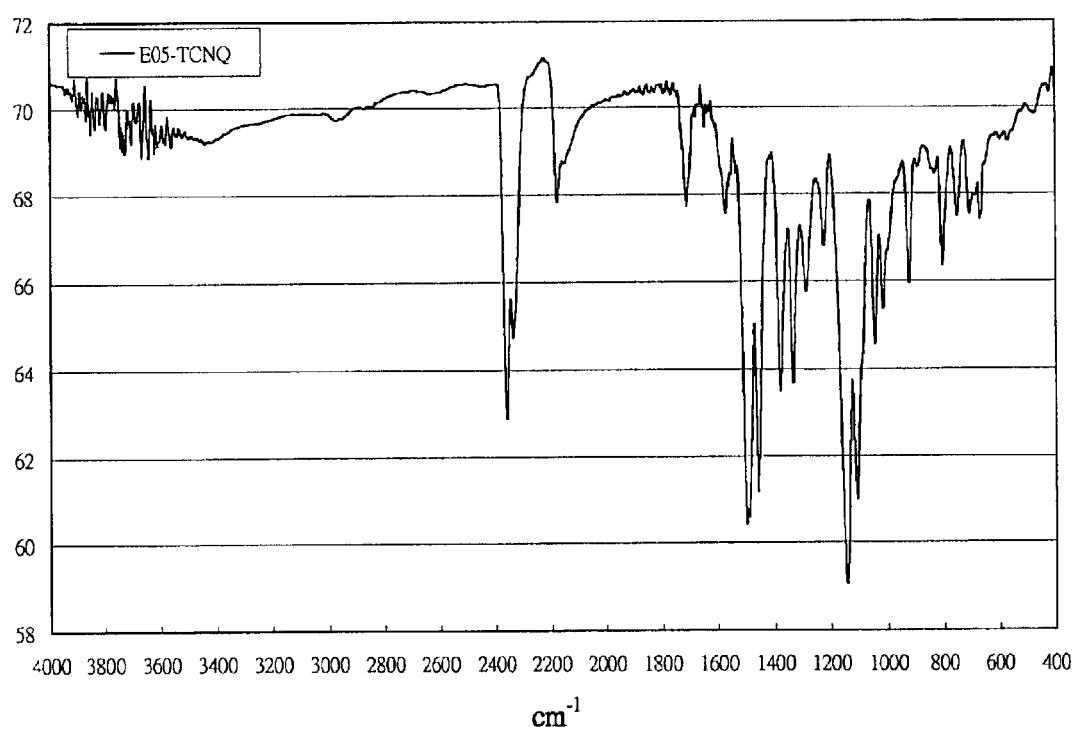
FIG. 16 illustrates an infrared (IR) spectrum of the cyanine-TCNQ complex dye (IV) of this invention.
Figure 17:
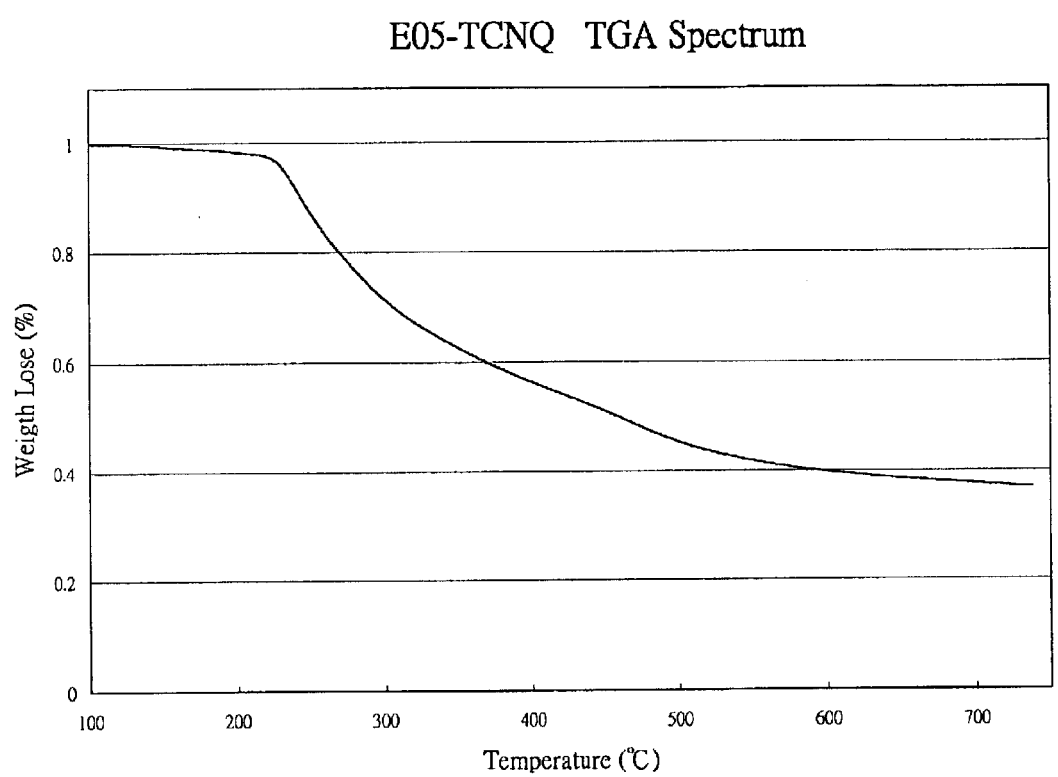
FIG. 17 illustrates the thermoweighing spectrum (10° C./min) of the cyanine-TCNQ complex dye (IV) of this invention.

(d) 1-(4"-methoxycarbonyl)benzyl-3,3-dimethyl-1'-(4"-methoxycarbonyl)-benzyl-3',3'-dimethylindo-2,2'-pentamethine TCNQ (IV) is prepared as follows:

A mixture of solution containing 1-(4'-methoxycarbonyl)benzyl-2,3,3-trimethylindoleninium iodide (6.16 g), 3-anilinoacrylaldehyde anil (TCI Chemical) (2.85 g) and sodium acetate (1.64 g) in acetic anhydride (20 mL) is heated at 100° C. for 2 hours. After cooling the resulting reaction mixture, the reaction mixture was charged into an aqueous solution of LiTCNQ (1.41 g) to obtain a solid substance, which was then dissolved in dichloromethane and washed with water several times, evaporated and recrystallized from ethanol to obtain dark green crystals (IV). A yield of 70% is achieved, the m.p. of the dark green crystals is 201° C. FIG. 15 shows that the UV/Visible/IR absorption spectrum for cyanine TCNQ complex dye (IV), λmax (EtOH)=649 nm; FIG. 16 and FIG. 17 show that IR spectrum and thermoweighing spectrum (10° C./min) for cyanine TCNQ complex dye (IV), respectively.

Example-4

Manufacturing Process of Optical recording Disc:

Cyanine-TCNQ complex dye (I), for example a mixture of the cyanine-TCNQ complex dye (III) and the cyanine-TCNQ complex dye (IV) (in 20:1 ratio), for example, is dissolved in 2,2,3,3-tetrafluoropropanol to form a homogenous solution. Then the resulting cyanine-TCNQ complex dye solution is spin coated onto a transparent substrate. For example, the spin coating process is carried out as follows. The dipping process is carried out at 30~500 rpm for 2~10 seconds, and a spinning out process is carried out at 1000~3000 rpm for 10~30 seconds. Finally, a baking process is carried out at 2000~5000 rpm for 10~30 seconds. Preferably, the layer of the cyanine-TCNQ complex dye layer coated onto the transparent substrate has a thickness of about 500 Å~2000 Å. Next, a layer of Au, Ag, Al, Cu, Cr or alloys thereof is coated on the cyanine-TCNQ complex dye layer to form a reflection layer. Preferably, the layer of the reflection layer has a thickness of about 500 Å~1000 Å. Finally, another transparent substrate is formed over the reflection layer through conventional methods such as spin coating, screen printing method, and thermo-melting glue method etc. Thus a high density optical recording disc is formed.

For example, while considering to use the cyanine-TCNQ dye (II), cyanine-TCNQ dye (III), and cyanine TCNQ dye (IV) of this invention, individually for manufacturing a data storage media, preferably a weight percentage of either of cyanine-TCNQ dye (II), cyanine-TCNQ dye (III), and cyanine TCNQ dye (IV) can be 0.5%~20%, and more preferably 2%~10%, is used. However, a weight percentage of cyanine TCNQ dye (II) to the total solution (including cyanine TCNQ dye (II), cyanine TCNQ dye (IV), and solvent) can be 0.5%~10%, and preferably 1%~5%.

For example, while considering to use a mixture of cyanine TCNQ dye (II) and cyanine TCNQ dye (IV) of this invention for manufacturing a data storage media, preferably a weight percentage of cyanine TCNQ dye (IV) to cyanine TCNQ dye (II) can be 0.5%~20%, and more preferably 2%~10%, is used. However, a weight percentage of cyanine TCNQ dye (II) to the total solution (including cyanine TCNQ dye (II), cyanine TCNQ dye (IV), and solvent) can be 0.5%~10%, and preferably 1%~5%.

For example, while considering to use a mixture of cyanine TCNQ dye (III) and cyanine TCNQ dye (IV) of this invention for manufacturing a data storage media, a weight percentage of cyanine TCNQ dye (IV) to cyanine TCNQ dye (III) can be 0.5%~20%, and preferably 2%~10%, can be used. However, a weight percentage of cyanine TCNQ dye (III) to the total solution (including cyanine TCNQ dye (III), cyanine TCNQ dye (IV), and solvent) can be 0.5%~10%, and preferably 1%~5%.

While preparing the data storage media using the cyanine-CNQ complex dye (I) of this invention, an organic solvent used for dissolving the cyanine-CNQ complex dye (I) can be selected one of from the following compounds: 2,2,3,3-tetrafluoropropanol, alcohol, ketone, ether, chloroform, dichloromethane, and DMF etc.

Figure 18:
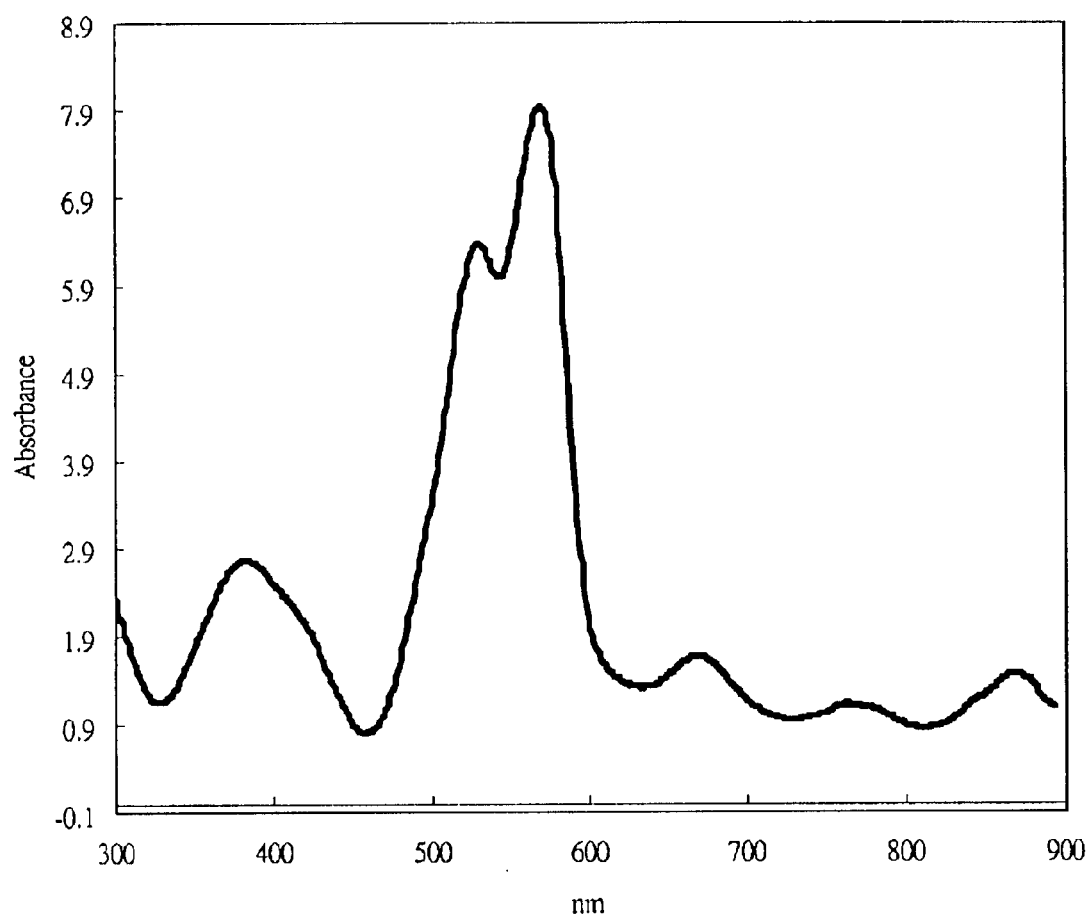
FIG. 18 illustrates the UV/Visible/IR absorption spectrum of a mixture of the cyanine-TCNQ complex dye (III) and the cyanine-TCNQ complex dye (IV) coated on the blank substrate plate of this invention.

FIG. 18 shows the UV/Visible/IR absorption spectrum of a layer of cyanine-TCNQ complex dye (I) taking a mixture of a mixture of the cyanine-TCNQ complex dye (III) and the cyanine-TCNQ complex dye (IV) as an example, after coating onto a transparent substrate.

Figure 19:
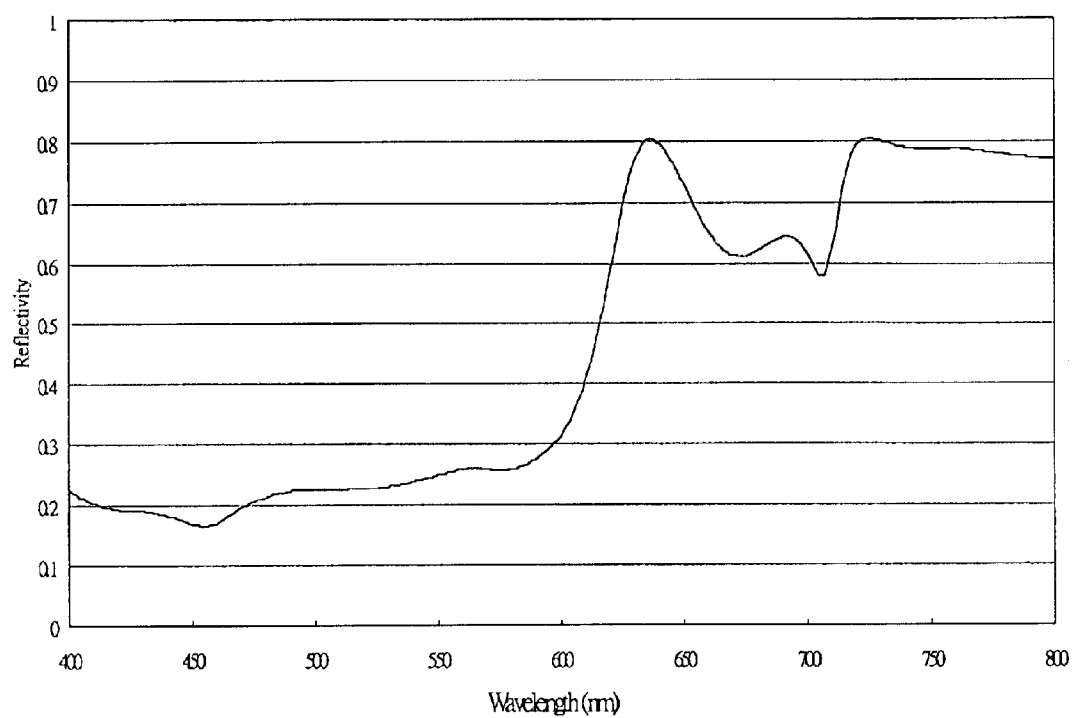
FIG. 19 illustrates the UV/Visible/IR reflection spectrum of the silver reflection layer manufactured with a mixture of the cyanine-TCNQ complex dye (III) and the cyanine-TCNQ complex dye (IV) of this invention.

FIG. 19 shows the UV/Visible/IR reflection spectrum of the silver reflection layer of an optical recording disc which is formed on the layer of cyanine-TCNQ complex dye (I) taking a mixture of a mixture of the cyanine-TCNQ complex dye (III) and the cyanine-TCNQ complex dye (IV) as an example. This structure of high density optical recording disc of this invention will have reflection index above 60% with λ=635 nm measured from the spectrum of reflection index vs. wavelength.

Figure 20:
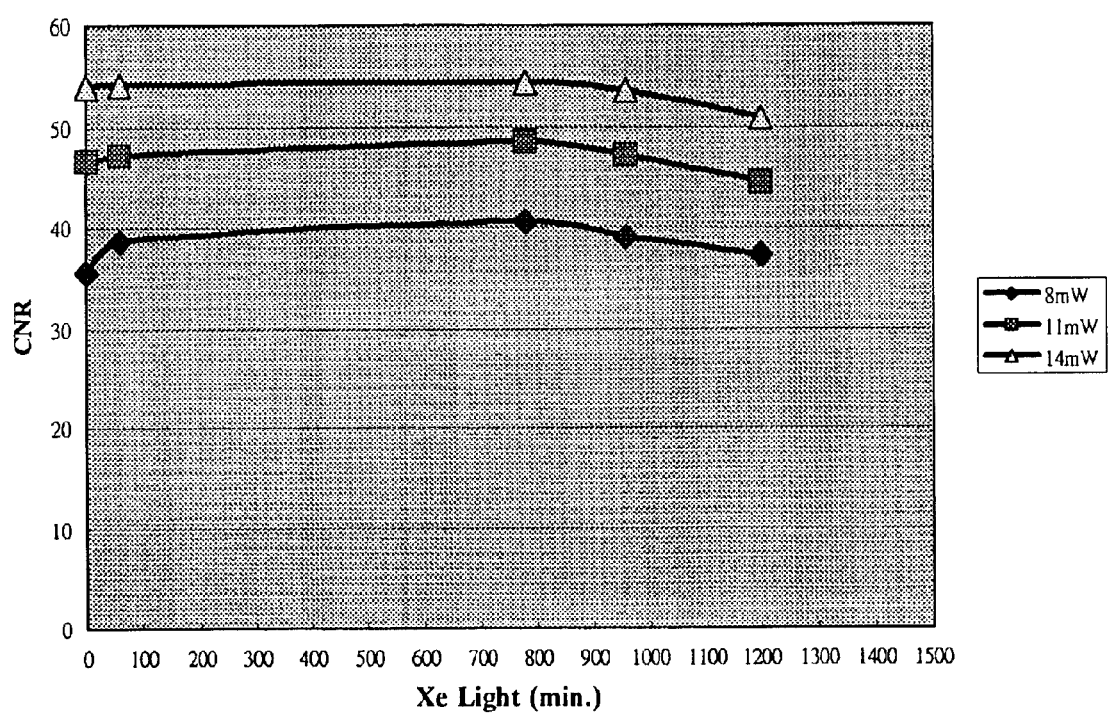
FIG. 20 illustrates the disc reading-writing test analysis and photo-endurance test experiment for an optical disc manufactured with a mixture of the cyanine-TCNQ complex dye (III) and the cyanine-TCNQ complex dye (IV) of this invention.

FIG. 20 shows the disc reading-writing examination analysis of the photo-endurance examination test for the optical disc manufactured by using cyanine-TCNQ complex dye (I) of this invention.

Figure 21:
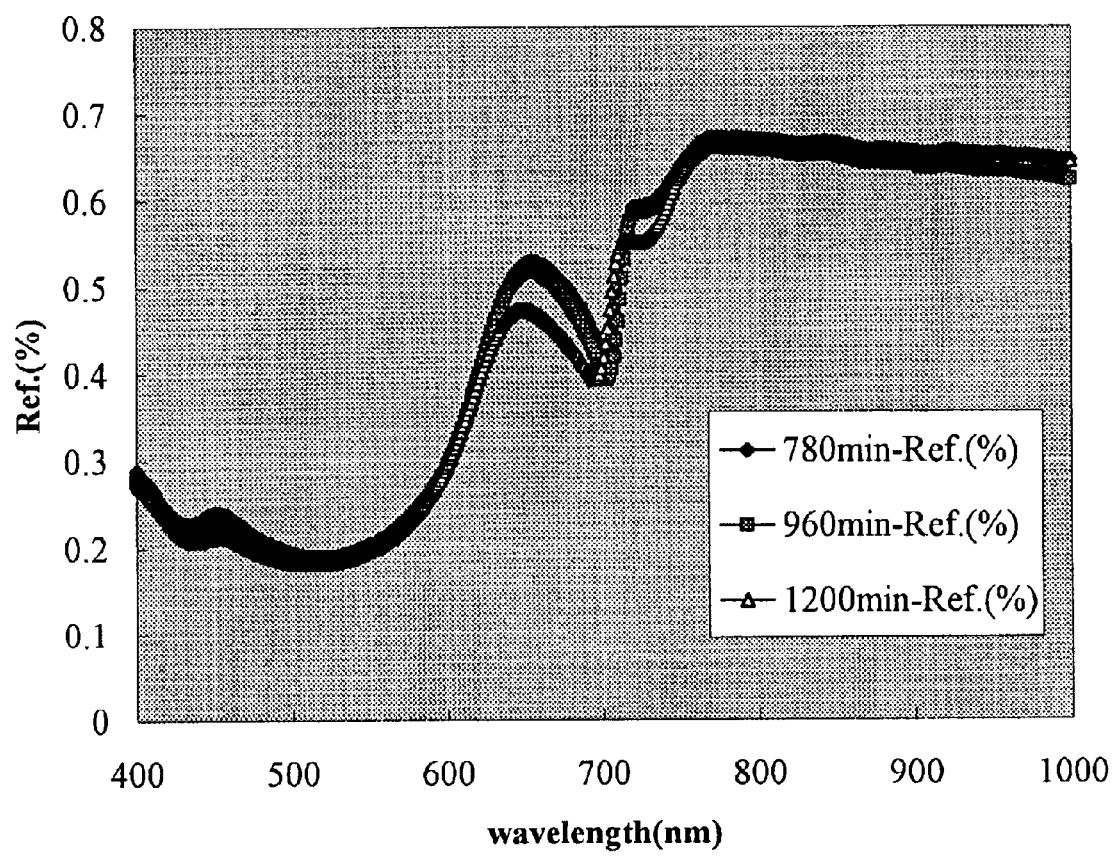
FIG. 21 illustrates the reflection index spectrum and photo-endurance test experiment for an optical disc manufactured with a mixture of the cyanine-TCNQ complex dye (III) and the cyanine-TCNQ complex dye (IV) of this invention.

FIG. 21 shows the reflection index spectrum of the photo-endurance examination test for the optical disc manufactured by using cyanine-TCNQ complex dye (I) of this invention taking a mixture of a mixture of the cyanine-TCNQ complex dye (III) and the cyanine-TCNQ complex dye (IV) as an example. It shows that cyanine-TCNQ complex dye of this invention can be successfully applied to the high density of optical disc storage system, and it is not necessary to add any photo-stabilizing agent as the cyanine-TCNQ complex dye inherently possess the excellent photo-stabilizing property.

Figure 22:
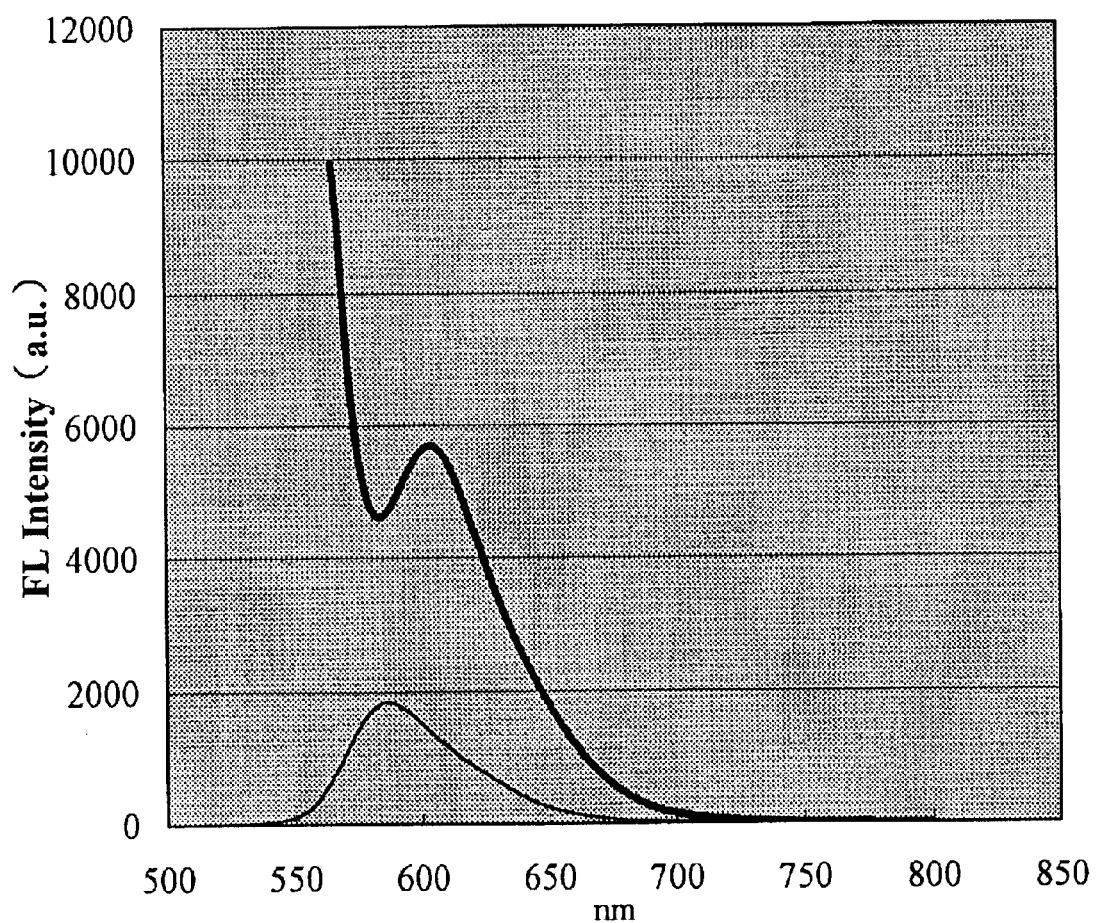
FIG. 22 illustrates the fluorescent spectrum irradiated at 551 nm of the cyanine-TCNQ complex dye (III) and the fluorescent photo of its thin layer of this invention.

FIG. 22 shows the fluorescent spectrum obtained from cyanine TCNQ complex dye (III) with 551 nm of the irradiating light source. The fluorescent recording layer components essentially comprises at least the cyanine-TCNQ complex dye (III), a layer of polymer resin, and an interface glue layer, but not including any photo-stabilizing agent.

The cyanine-TCNQ complex dye (I) has a maximum absorption both in UV light region with wavelength range of 200 nm~400 nm and in near IR light region with wavelength range of 800 nm~1000 nm. Thus the short wave light resource (the wavelength is smaller than 400 nm) can be eliminated which would otherwise tend to break the chemical bonds, through the charge transfer and irradiation of fluorescent light pathway to transfer the energy. In addition, since the cyanine TCNQ charge transfer complex possesses a higher oxidation potential than that of a general cyanine halide such as a cyanine $ClO_4$, or cyanine $PF_6$ complex, and therefore TCNQ possesses a better inhibition to singlet oxygen from attacking the main structure of cyanine dye, and thus can increase the photostability of cyanine dye. Thus a need of addition of a photostabilizer can be eliminated.

While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations, which fall within the spirit and scope of the included claims. All matters set forth herein or shown in the accompanying drawings are to be interpreted in an illustrative and non-limiting sense.

What is claimed is:

1. A data storage media comprising at least a cyanine-tetracyanoquinodimethane (cyanine-TCNQ) complex dye, the cyanine-TCNQ complex dye comprising a TCNQ molecule chemically bonded to a cyanine molecule having a structural formula (I) as follows:

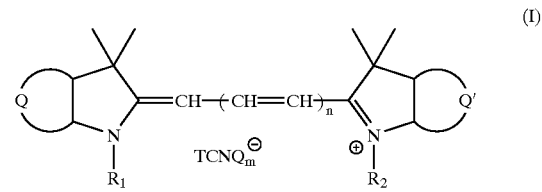

(I)

wherein Q and Q' are selected from one of aromatic and polyaromatic groups, R1 is selected from a group consisting of alkylthio and alkoxythio, R2 is an alkyl group of C1~C18, n represents an integer of 0, 1, 2, or 3, TCNQ-m represents 7,7',8,8'-tetracyanoquinodimethane and its derivatives, and m represents an integer of 1 or 2.

2. A data storage media, comprising:
a substrate; and
an optical recording layer formed on the substrate, wherein the optical recording layer comprises a cyanine-TCNQ complex dye having a structural formula (I) as follows:

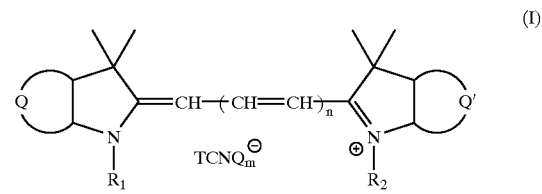

(I)

wherein Q and Q' are selected from one of aromatic and polyaromatic groups, R1 is selected from a group consisting of alkylthio and alkoxythio, R2 is an alkyl group of C1~C18, n represents an integer of 0, 1, 2, or 3, TCNQ-m represents 7,7',8,8'-tetracyanoquinodimethane and its derivatives, and m represents an integer of 1 or 2.

3. The data storage media of claim 2, further comprising a reflection layer formed on the optical recording layer, wherein the reflection layer is made of a material selected from the group consisting of gold, silver, aluminum, copper, chromium, and alloys thereof.

4. The data storage media of claim 2, further comprising an organic solvent used to dissolve the cyanine-TCNQ complex dye for forming the optical recording media, wherein the organic solvent is selected from the group consisting of 2,2,3,3-tetrafluoropropanol, alcohol, ketone, ether, chloroform, dichloromethane, and dimethylformamide.

* * * * *